Figure 1:
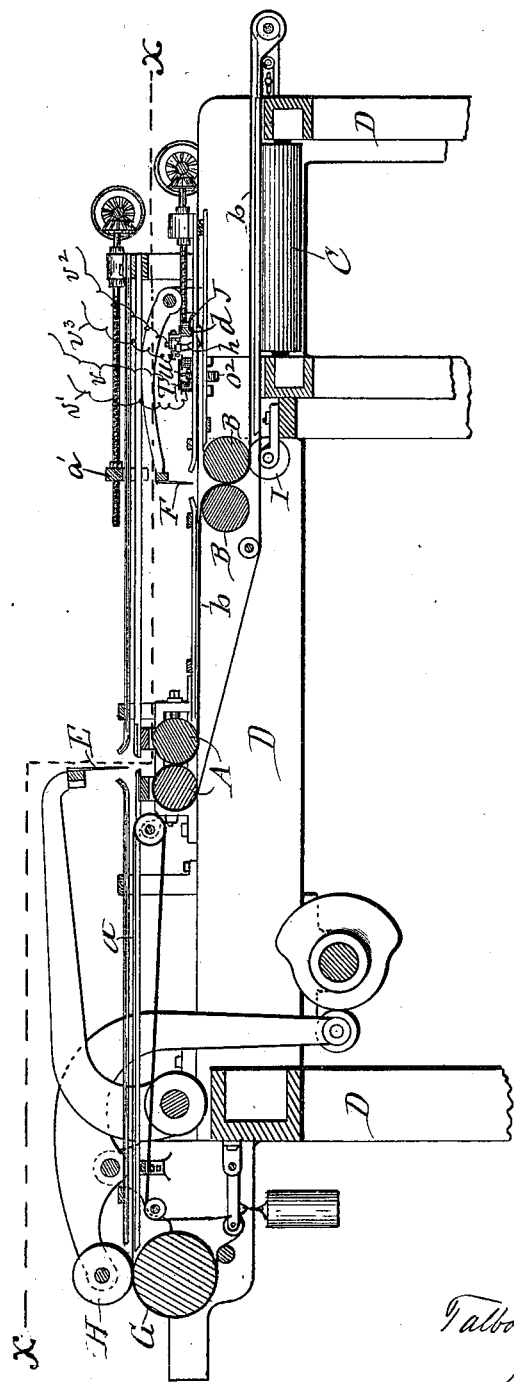

No. 655,964. Patented Aug. 14, 1900.
T. C. DEXTER.
PAPER REGISTERING INSTRUMENT.
(Application filed Nov. 18, 1899.)
(No Model.) 7 Sheets—Sheet 3.

WITNESSES:
H. B. Smith
J. J. Laass

INVENTOR
Talbot C. Dexter
By E. Laass
ATTORNEY

No. 655,964.  
T. C. DEXTER.  
PAPER REGISTERING INSTRUMENT.  
(Application filed Nov. 18, 1899.)  
Patented Aug. 14, 1900.
(No Model.) 7 Sheets—Sheet 4.
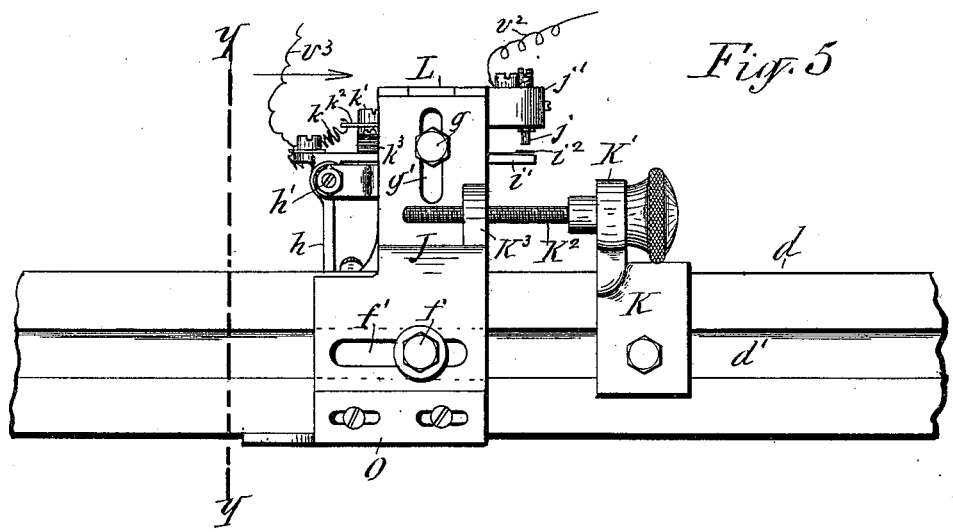
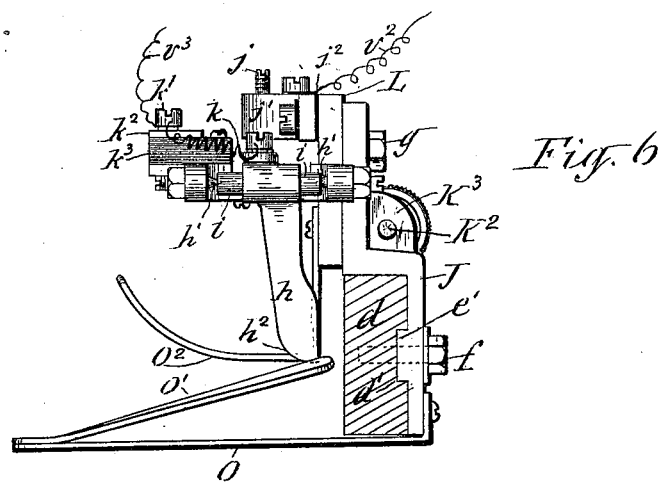
WITNESSES:  
H. B. Smith  
J. J. Laass
INVENTOR  
Talbot C. Dexter  
By E. Laass  
ATTORNEY No. 655,964. Patented Aug. 14, 1900.
T. C. DEXTER.
PAPER REGISTERING INSTRUMENT.
(Application filed Nov. 18, 1899.)
(No Model.) 7 Sheets—Sheet 5.
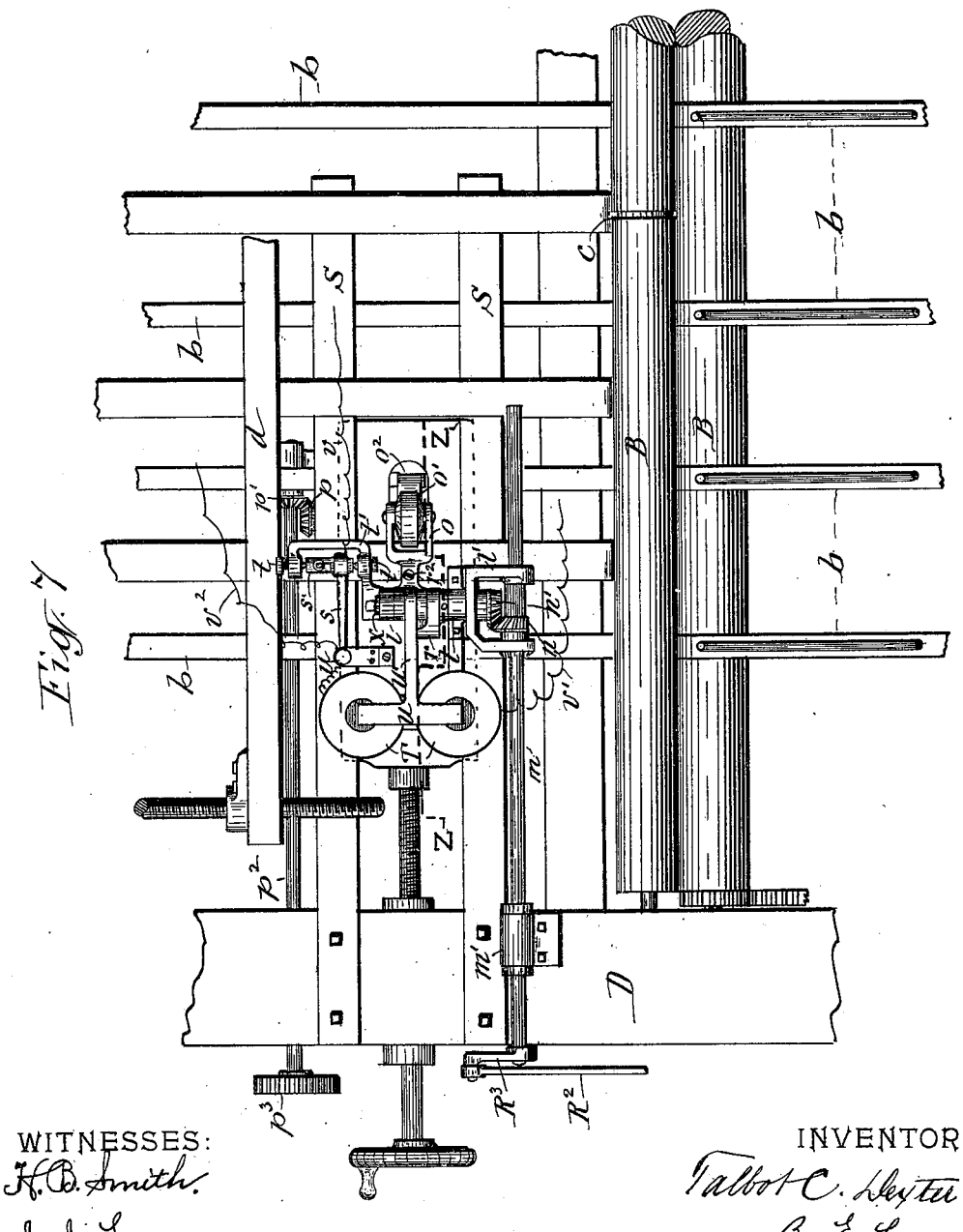
WITNESSES:
INVENTOR
ATTORNEY No. 655,964. Patented Aug. 14, 1900.
T. C. DEXTER.
PAPER REGISTERING INSTRUMENT.
(Application filed Nov. 18, 1899.)
(No Model.) 7 Sheets—Sheet 6.
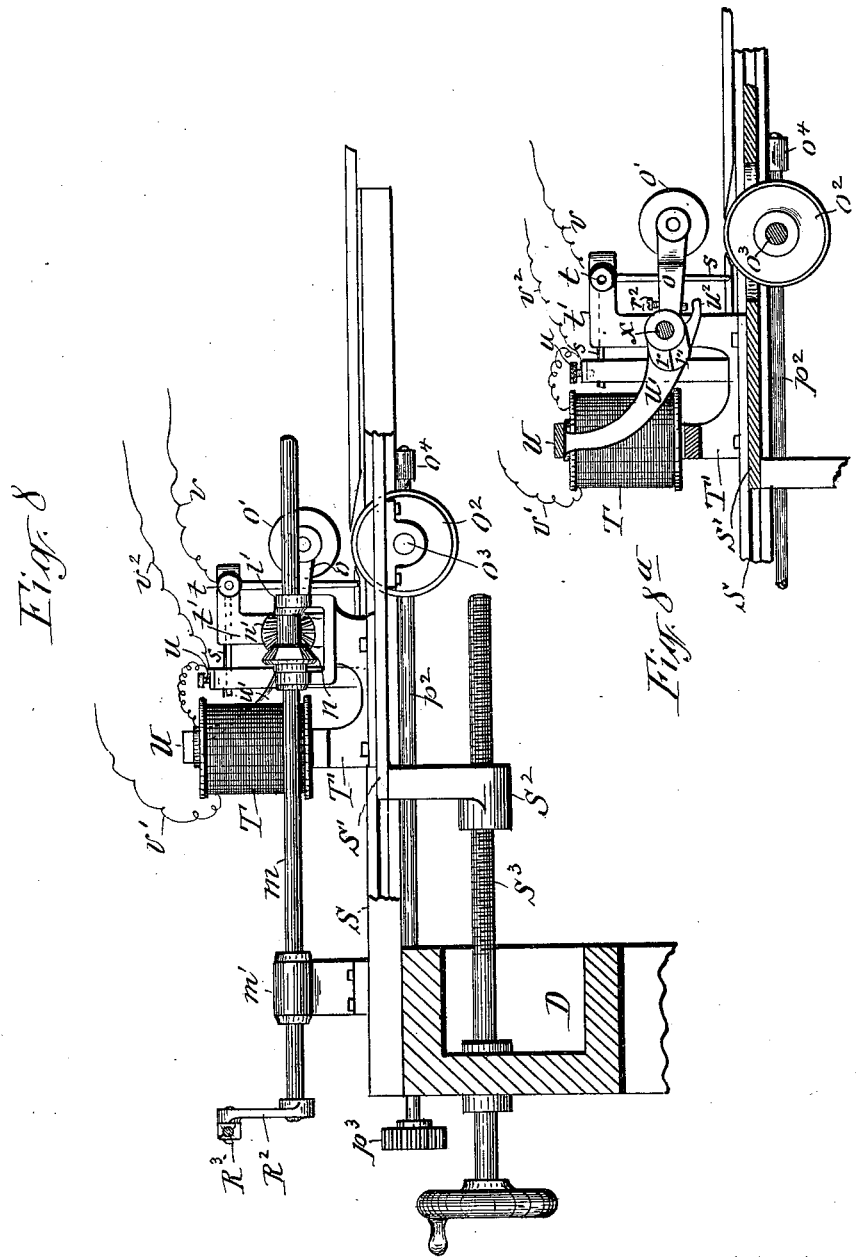
WITNESSES:
INVENTOR
Talbot C. Dexter
By E. Laass
ATTORNEY No. 655,964. Patented Aug. 14, 1900.
T. C. DEXTER.
PAPER REGISTERING INSTRUMENT.
(Application filed Nov. 18, 1899.)
(No Model.) 7 Sheets—Sheet 7.
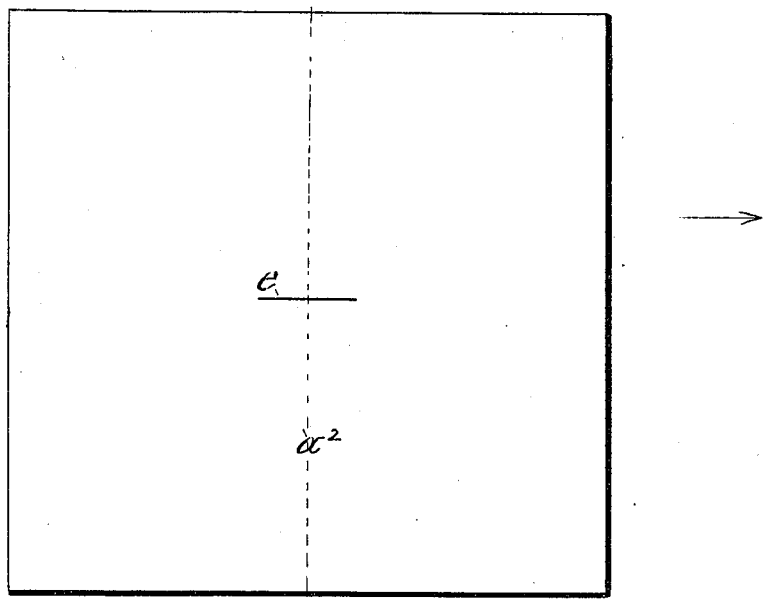
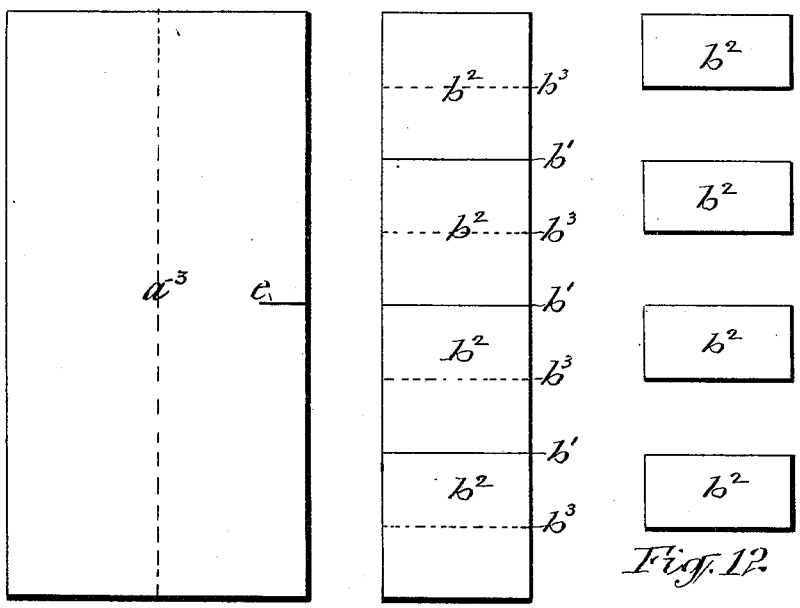
WITNESSES:
H. B. Smith.
J. J. Laass.
INVENTOR
Talbot C. Dexter
By E. Laass
ATTORNEY

UNITED STATES PATENT OFFICE.

TALBOT C. DEXTER, OF PEARL RIVER, NEW YORK, ASSIGNOR TO THE DEXTER FOLDER COMPANY, OF SAME PLACE.

PAPER-REGISTERING INSTRUMENT.

SPECIFICATION forming part of Letters Patent No. 655,964, dated August 14, 1900.

Application filed November 18, 1899. Serial No. 737,462. (No model.)

*To all whom it may concern:*

Be it known that I, TALBOT C. DEXTER, a citizen of the United States, and a resident of Pearl River, in the county of Rockland, in the State of New York, have invented new and useful Improvements in Paper-Registering Instruments, of which the following, taken in connection with the accompanying drawings, is a full, clear, and exact description.

This invention relates to the paper-folding machine shown in my Letters Patent No. 564,555, dated July 21, 1896, or to the class of machines which are designed to fold and separate a plurality of signatures all printed on one sheet and which make the first and second folds on parallel lines and sever the twice-folded sheet on one or more lines at right angles to said folds and subsequently fold the separated sections or signatures at right angles to the second fold. In said class of machines it is very essential to accurately register the sheet laterally at the second folding-rollers in order to bring the subsequent lines of cutting and folding exactly in the center of and parallel with the margin in which the signatures are to be separated and folded. In the machine shown in my aforesaid Letters Patent I have provided an instrument for registering the sheet laterally by the side margin of the sheet and which instrument was controlled in its action by its contact with the side edge of the sheet drawn toward it. Such means of registering, however, are not reliable, because they require the side margin of the sheet to be of a uniform width throughout its length, inasmuch as any variation in said width will vary the time of action of the registering instrument. In practice it has been found that said margin often varies, owing to the fact that on many sheets the side and end edges are out of square or not exactly at right angles to each other, and in the operation of feeding the sheet to the printing-press said sheet is placed against the side guide, which is located on the feed-board about eight inches from the front edge of the sheet when in position to pass into the press. Consequently when such sheets are folded across the center they do not present the same width of margin at the fold as the width of margin presented to the aforesaid side guide on the feed-board of the press.

The object of my present invention is to obviate the aforesaid liability of inaccurately registering the paper laterally at the second pair of folding-rollers, and to that end the invention consists, essentially, of a registering instrument disposed in proximity to the second-fold gage and provided with means for engaging an abutment presented in the surface of the sheet, and suitable means for shifting said sheet to carry the said abutment into engagement, and thereby register the folded sheet in advance of its entry into the second folding-rollers, as hereinafter more fully described.

Figure 2:
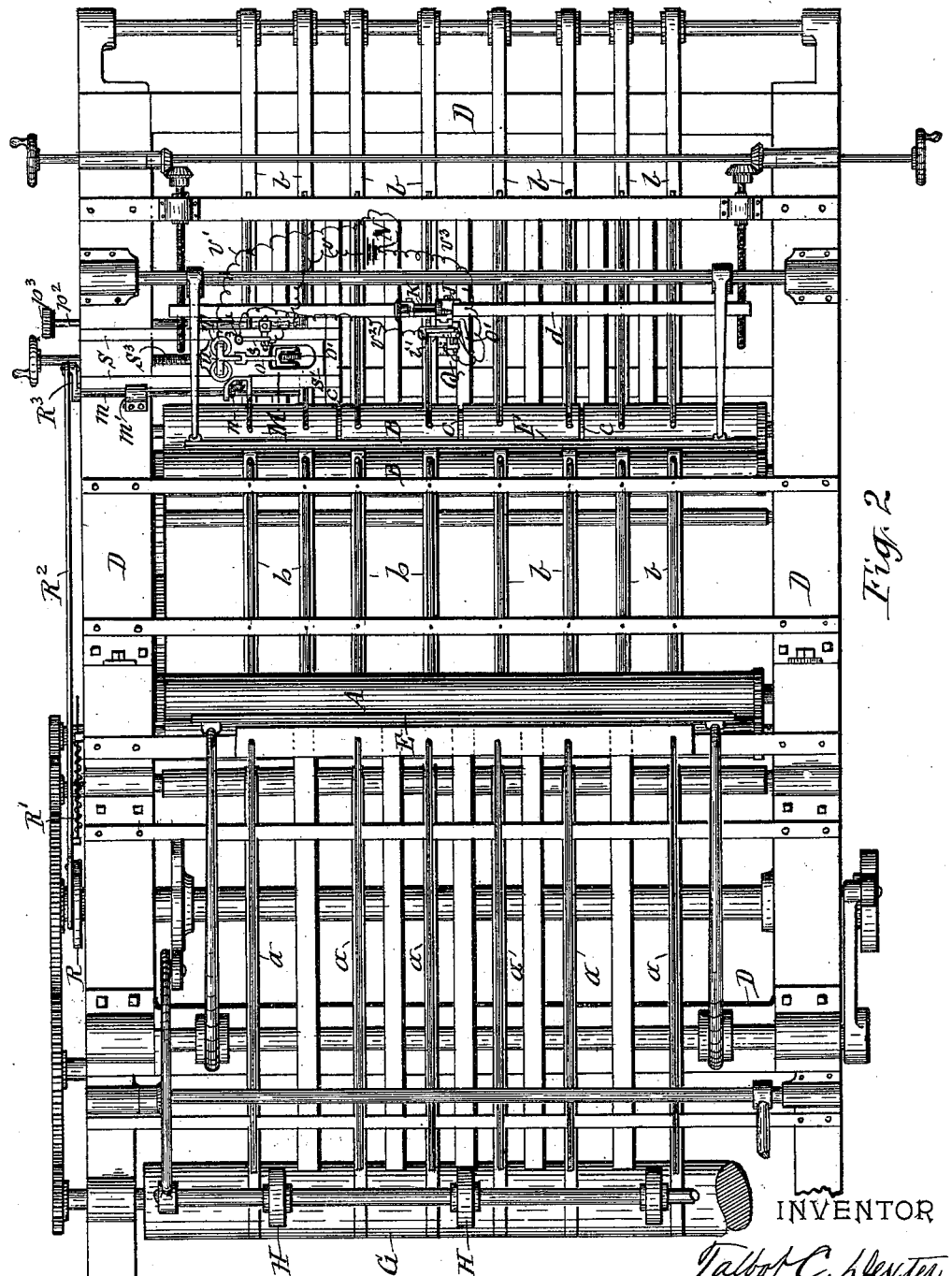
Figure 3:
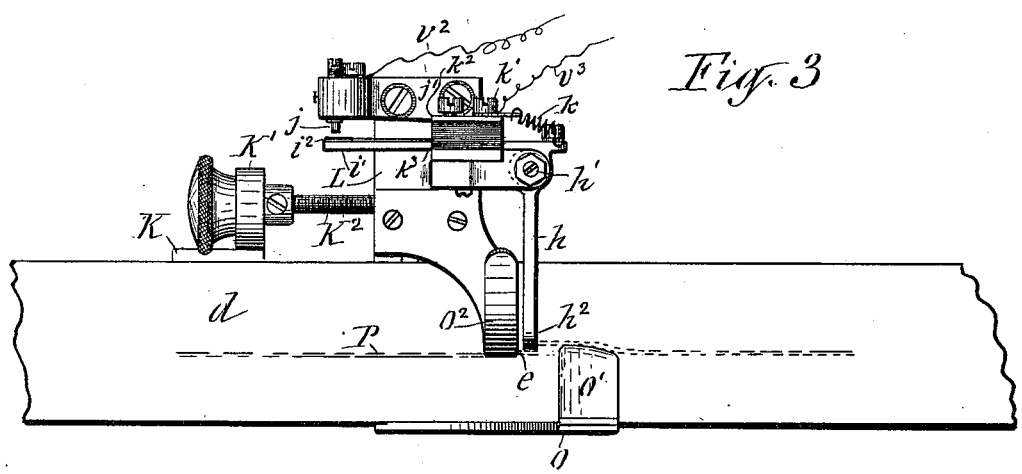
Figure 4:
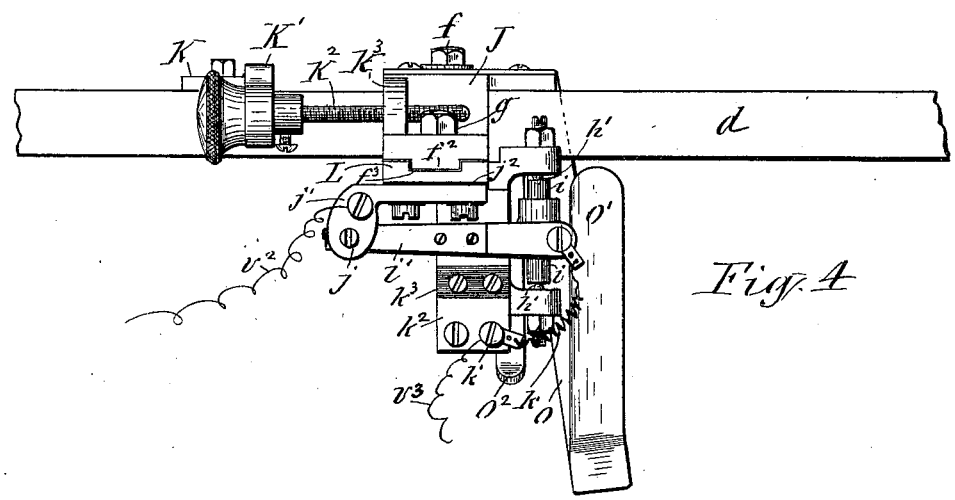

In the annexed drawings, Figure 1 is a vertical longitudinal section of a paper-folding machine embodying my improvements. Fig. 2 is a plan view of the same, taken on the plane indicated by dotted line X X in Fig. 1. Figs. 3, 4, and 5 are respectively front, plan, and rear views of the instrument employed for registering the paper by a slit made in the paper by means of a cutter placed in the form in the printing-press. Fig. 6 is a vertical transverse section on line Y Y in Fig. 5 viewed in the direction of the arrow. Fig. 7 is a plan view of the instrument employed for shifting the once-folded sheet to register the same by the instrument illustrated in Figs. 3, 4, 5, and 6. Fig. 8 is a side view of said sheet-shifting instrument. Fig. $8^a$ is a vertical longitudinal section on line Z Z in Fig. 7, showing the paper-shifting devices in position to allow the paper to freely pass to the second-folding gage. Figs. 9, 10, 11, and 12 are plan views illustrating the different conditions of the sheet operated on during its passage through the folding-machine, the dotted lines indicating the lines of folding.

A B C represent the first, second, and third folding-rollers, which are journaled in bearings mounted on a suitable supporting-frame D and are geared to rotate in the usual and well-known manner.

E and F denote the blades which tuck the sheet into the bites of the first and second folding-rollers. The folding-blades of the third folding-rollers are not shown.

$a\ a$ are the tapes which convey the sheet from the feed-roller G to the first pair of folding-rollers A.

H denotes the usual drop-rollers, which serve to press the sheet into more perfect frictional contact with said feed-roller.

$b\ b$ are the tapes which carry the once-folded sheet from the folding-rollers A over the second folding-rollers B and extend from the latter rollers over the third folding-rollers C to carry the twice-folded sheet thereto.

The machine is designed to fold either four signatures of sixteen pages each or two signatures of thirty-two pages each printed on one sheet. For this purpose the first and second pairs of folding-rollers A and B are arranged parallel with each other, and the third folding-rollers C are placed at right angles to the second folding-rollers. A plurality of pairs of said third folding-rollers are disposed to receive the signatures which are separated by means of annular cutters I, having their cutting edges working in circumferential grooves $c\ c$ in one of the rollers B, between which roller and cutters the twice-folded paper passes in being carried to the third folding-rollers.

When the machine is required to fold four signatures of sixteen pages each, there are to be three cutters placed equidistantly apart and in proper position to cut the paper into four equal parts, as represented in Figs. 11 and 12 of the drawings. For folding two signatures of thirty-two pages each only one of said cutters is employed at a point central of the length of the roller B.

Fig. 9 shows the condition of the sheet when fed into the folding-machine. Said sheet is carried over the first folding-rollers A A by the tapes $a\ a$ and to the usual front stop $a'$, by which it is arrested in proper position to allow the blade E to strike it across the center on the line indicated at $a^2$ in Fig. 9 of the drawings and tuck it into the bite of the folding-rollers A A. In passing between said rollers the sheet is folded into the shape represented in Fig. 10 and is then carried by the tapes $b\ b$ to the second pair of folding-rollers B B, where it is temporarily arrested by a gage $d$, which is parallel with said rollers and a proper distance therefrom to cause the once-folded sheet to lie with the central line $a^3$ directly over the bite of the said second folding-rollers. The blade F then introduces said sheet into said rollers, by which it is folded into the condition shown in Fig. 11. In passing from said rollers the cutters I sever the paper on the lines $b'$ and separate the four signatures $b^2$, which then pass over four pairs of parallel folding-rollers C. (Not shown in Fig. 2 of the drawings.) These rollers are at right angles to the folding-rollers B and fold the signatures $b^2$ on lines $b^3$ and into the condition shown in Fig. 12 of the drawings. It is the accurate separating and folding of these signatures which require perfect lateral registering of the paper at the second folding-rollers B B, and for this purpose I employ my improved registering instrument in connection with paper which has a slit E (see Figs. 9 and 10 of the drawings) cut in the center thereof by means of a die set in the form which prints the paper. Said slit is made in a position to extend at right angles across the first line of folding, (indicated at $a^2$ in Fig. 9 of the drawings.) The said registering instrument is located at the center of the length of the second-fold gage $d$, as shown at Q in Fig. 2 of the drawings, and is preferably constructed as illustrated in Figs. 3, 4, 5, and 6 of the drawings, in which J represents the main stay of a bracket which is mounted on the gage $d$ and adjustable in its position lengthwise of the gage. Said main stay is formed with a horizontal tongue $e'$, which engages a longitudinal groove $d'$ in the back of the gage $d$, as shown in Figs. 5 and 6 of the drawings.

By means of a screw $f$, passing through a horizontal slot $f'$ in the main stay J and inserted into a screw-threaded socket in the gage $d$, said main stay is clamped adjustably in its position.

To effect the adjustment of the main stay more accurately, an arm K is secured to the gage and has an ear $K'$, in which is journaled the adjusting-screw $K^2$, which is preventde from moving longitudinally by means of collars or shoulders on the screw at opposite sides of the aforesaid ear. This screw works in a screw-threaded eye in a projection $K^3$ on the main stay J.

The front of the upper end portion of the main stay is formed with a vertical tongue $f^2$ and supports a supplemental plate L, which is provided with a vertical groove $f^3$, by which it embraces the tongue $f^2$, as shown in Fig. 4 of the drawings. Said plate is adjustable vertically and retained in its adjusted position by means of a screw $g$, passing through a vertical slot $g'$ in the main stay J and engaging a socket in the plate. On this supplemental plate L is supported the registering instrument proper, which is thus adjustable to operate on sheets of different thicknesses, said registering instrument consisting of the registering-tongue $h$, which is suspended from pivot-screws $h'$, secured to projections on said plate and axially at right angles to the gage $d$ to allow the said registering-tongue to rock laterally in relation to the line of delivery of the paper. The free lower end of this registering-tongue is immediately over the plane of the paper delivered to the gage $d$ and is beveled or rounded, as shown at $h^2$, to prevent interference with the delivery of the paper to said gage.

The bearings $i\ i$, by which the registering-tongue $h$ is suspended from the pivots $h'$, are formed of rubber or other suitable insulating material, and from the upper end of said tongue extends an arm $i'$, having on its free end an electric contact-point $i^2$, over which is a contact-screw $j$, adjustably secured to a plate $j'$, fastened to the plate L and insulated therefrom, as shown at $j^2$.

The registering-tongue $h$ is electrically connected by a wire $k$ to a binding-post $k'$ on a plate $k^2$, mounted on an insulating-block $k^3$, fastened to a projection on the plate L.

The plates $j'$ and $k^2$ constitute two terminals of electric circuit derived from a suitable battery, (indicated at N in Fig. 2 of the drawings.)

The registering-tongue $h$ is designed to abut against one of the edges in the slit $e$ in the paper while shifted laterally after it has been arrested by the gage $d$. To insure said abutting, I attach to the hereinbefore-described supporting-bracket of the registering-tongue $h$ suitable slit-opening devices, preferably formed of an arm O, which is attached at one end to the main stay J of the hereinbefore-described bracket and extends horizontally therefrom beneath the gage $d$ and some distance from the face thereof. To the free end of this arm is attached a plate O', which extends ascendingly toward the face of the gage $d$ at one side of the registering-tongue $h$ and terminates thereat slightly above the plane of the bars or supports upon which the paper is carried to the gage. The plate O' is thus caused to lift the portion of the paper lying upon it. At the opposite side of the registering-tongue $h$ is a paper-depresser consisting of a finger $O^2$, which is attached to the supplemental plate L of the bracket, and is thus adjustable vertically with the registering-tongue $h$. The said finger extends ascendingly from the face of the gage $d$ to allow the paper to pass freely under it in its travel to the said gage.

The lifting of the paper by the plate O' at one side of the slit $e$ with the depression of the paper by the finger $O^2$ at the opposite side of the slit causes said slit to be opened, as illustrated in Fig. 3 of the drawings, in which the dotted line P represents the paper. One of the edges of the slitted portion of the paper is thereby caused to present an abutment which in the subsequent lateral shifting of the paper is carried into contact with the lower end of the registering-tongue $h$ and moves the same sufficiently to cause the arm $i'$ thereof to carry the contact-point $i^2$ to the contact-screw $j$, and thus close the circuit thereat, which circuit is utilized as hereinafter described.

It is obvious that the described supporting-bracket of the registering instrument and the means for supporting it in its requisite position in relation to the gage $d$ is susceptible of many modifications, and I therefore do not limit myself strictly to the construction herein described.

For shifting the paper laterally and registering the same by the tongue $h$ after the paper has been arrested by the gage $d$ any suitable electrically-controlled mechanism may be employed—as, for instance, the electrically-controlled gripper shown in my Letters Patent No. 550,950, dated December 10, 1895, or the electrically-controlled sheet-gripping rollers shown in my Letters Patent No. 528,657, of November 6, 1894, or No. 564,555, of July 21, 1896. The sheet-shifting devices selected for illustration in this case are indicated at M in Fig. 2 of the drawings, and their construction is illustrated in Figs. 7, 8, and 8ª of the drawings. Referring to these figures, S S represent horizontal guides mounted on the main frame D and arranged parallel with the gage $d$. Upon said guides is supported a longitudinally-adjustable plate S', having rigidly secured to it a nut $S^2$, through which passes the horizontal adjusting-screw $S^3$, which is parallel with the guides S S and is journaled in the frame D and restrained from moving longitudinally by collars fastened to the screw at opposite sides of its bearing on the frame. By means of said screw the paper-shifting devices mounted on the plate S' can be placed in proper position to operate on paper of different lengths.

T denotes an electromagnet which is mounted on a bracket T', secured to the plate S'. Transversely over this plate is a short shaft $x$, mounted in bearings $l\,l$ upon said plate. At right angles to said shaft is a rock-shaft $m$, which is supported in a bearing $m'$, mounted on the frame D and in a yoke $l'$, projecting from the side of one of the bearings $l$. Within said yoke is a miter-gear $n$, fastened to the rock-shaft $m$ and meshing with a similar gear $n'$ on the end of the aforesaid short shaft, which thus receives a rocking motion. The mechanism for imparting motion to said rock-shaft is shown in Fig. 2 of the drawings and consists of a rotary cam R, which, in conjunction with a spring R', imparts an intermittent reciprocating motion to a rod $R^2$, connected to an arm $R^3$, fastened to the end of said rock-shaft. An arm $o$ is loosely connected at one end to the shaft $x$ and is formed at the opposite end with a yoke in which is pivoted a roller $o'$, and directly under this roller is a rubber-faced roller $o^2$, fastened to a shaft $o^3$, journaled in bearings $o^4$, fastened to the plate S', as shown in Fig. 8 of the drawings. The shaft $o^3$ is rotated by means of a miter-pinion $p$, fastened to said shaft and engaging a corresponding pinion $p'$, secured to a shaft $p^2$, which is parallel with the guides S S and supported in suitable bearings on one of said guides and on the frame D. The shaft $p^2$ has attached to its end a gear $p^3$, which receives rotary motion from a train of gears or by other suitable means driven by one of the rotary shafts of the machine, as may be found expedient by the construction of said machine. The roller $o^2$ protrudes through an opening in the plate S' and has its top in or very nearly in the plane of the bottom of the paper in passing over it to the gage $d$. To allow said paper to freely pass to said gage, the shaft $x$ has affixed to it a cam $r$, which bears on a shoulder $r'$, projecting from the heel or pivoted end of the roller-carrying arm $o$, so that the rocking of said shaft in one direction depresses said shoulder, and thereby causes the arm $o$ to lift the roller $o'$ from the roller $o^2$, as represented in Fig. 8$^a$. The action of the shaft $x$ is timed so as to allow the roller $o'$ to drop and press the paper into frictional contact with the subjacent roller $o^2$ as soon as the once-folded sheet has been arrested by the gage $d$. Said frictional contact of the paper with the rotating roller $o^2$ draws the arrested sheet laterally or toward the said roller, and during this movement the registering-tongue $h$ of the instrument located at Q comes in contact with one of the edges of the slit $e$ in the paper, and by abutting against said edge it closes the electric circuit thereat, as hereinbefore described. To register said paper automatically during its said lateral movement, I employ the electromagnet T, which is in circuit with the terminals on the instrument located at Q, as hereinafter described. The armature U of said magnet has extending from it a lever U', which is fulcrumed on the shaft $x$ and is formed with a lug U$^2$ under the roller-carrying arm $o$, which has adjustably secured to it a vertical screw $r^2$, disposed directly over the lug U$^2$, as shown in Fig. 8$^a$ of the drawings. The result is that when the magnet T is energized the armature-lever U' lifts by its lug U$^2$ the arm $o$, and thus deprives the lower roller $o^2$ of its frictional hold on the overlying paper and arrests the movement of said paper. It will therefore be observed that when the registering-tongue $h$ is actuated by contact with the edge of the slit $e$ in the paper during the lateral shifting imparted to said paper by the roller $o^2$ the resultant closing of the circuit by the action of said tongue causes the movement of the paper to be arrested, and this leaves the paper in registered position.

To guard against excessive lateral movement of the paper incident to accidental failure of the operation of the registering-tongue $h$, I employ at the aforesaid paper-shifting mechanism a suitable automatic circuit maker and breaker controlled by the edge of the shifting paper and preferably formed of a bell-crank $s$, fastened at a shaft $s'$ of insulating material and pivoted sensitively at the ends of said shaft to adjustable pivot-screws $t\,t$, connected to a suitable stationary bracket $t'$, mounted on the plate S'. One of the limbs of said bell-crank depends from the shaft $s'$ and has its lower end in position to be encountered by the edge of the laterally-shifting paper, while the other limb of said bell-crank extends under a contact-screw $u$, which is electrically connected with the magnet T. This bell-crank is normally out of contact with said screw, and thus the circuit remains broken until the edge of the laterally-shifting paper strikes the lower end of said bell-crank and by tilting the same throws the opposite end thereof into contact with the screw $u$, and thus closes the circuit. The energized magnet T then actuates the armature-lever U' to lift the roller-carrying arm $o$, as hereinbefore described.

The two circuit makers and breakers at the two described instruments located at Q and M are in the same circuit, so that either of them can control the shifting of the paper independent of the other. Said circuit is formed by a wire $v$ extending from the bell-crank $s$ to the battery N, a wire $v'$ extending from the magnet T to said battery, a wire $v^2$ extending from the contact-screw $u$ to a binding-screw on the plate $j'$, carrying the contact-screw $j$ of the instrument at Q, and a wire $v^3$ extending from the binding-screw $k'$ at the latter instrument to the battery N.

What I claim as my invention is—

1. The combination with two pairs of folding-rollers disposed parallel with each other, conveyers carrying the folded sheet from the delivery of one of said pairs of rollers to a position over the other pair of rollers, and a gage arresting the sheet in said position, of a registering instrument disposed in proximity to said gage and provided with means for engaging an abutment presented in the surface of the sheet and means for shifting said sheet to carry the aforesaid abutment into engagement and thereby register the folded sheet in advance of its entry into the second folding-rollers as set forth.

2. In a paper-folding machine having the second folding-rollers parallel with the first folding-rollers and a sheet-arresting gage disposed to receive the impact of the folded edge of the sheet delivered over the second folding-rollers, a registering instrument located at said gage and equipped with a tongue to engage a slit made in the folded edge of the sheet at right angles to said edge, and means for shifting said sheet in a line parallel with the aforesaid gage to carry the slitted portion of the sheet into contact with the aforesaid tongue and thereby register said sheet.

3. The combination with two pairs of folding-rollers disposed parallel with each other, tapes conveying the folded sheet from the first to the second pair of said rollers and a gage arresting the sheet delivered over the second pair of rollers, a registering instrument provided with a tongue for engaging an abutment presented in the surface of the sheet arrested by the aforesaid gage, and means for shifting the arrested sheet on a line parallel with the gage to bring the abutment in contact with the aforesaid tongue and controlled in its action by said contact.

4. The combination with two pairs of folding-rollers disposed parallel with each other, tapes conveying the folded sheet from the first to the second pair of said rollers, and a gage arresting the sheet delivered over the second pair of rollers, a registering instrument provided in proximity to said gage with a tongue for engaging a slit made in the folded edge of the sheet at right angles to said edge, an electric-circuit maker actuated by said tongue, and electrically-controlled means for shifting the paper on a line parallel with the gage and in circuit with the aforesaid maker.

5. The combination with two pairs of folding-rollers, tapes conveying the folded paper from the first to the second pair of said rollers, and a gage arresting the delivered paper, a bracket sustained over the central portion of said gage, a laterally-yielding tongue carried on said bracket and disposed to engage a slit made in the paper at right angles to the folded edge, an electric-circuit maker actuated by said tongue and electrically-controlled means for shifting the paper on a line parallel with the gage and in circuit with the aforesaid maker.

6. The combination with two pairs of folding-rollers, tapes conveying the folded paper from the first to the second pair of said rollers, and a gage arresting the delivered paper, a bracket sustained on the central portion of said gage, a laterally-yielding registering-tongue carried on said bracket and disposed to engage a slit made in the paper at right angles to the folded edge, slit-opening devices disposed in proximity to said tongue, means for shifting said folded paper to bring the slitted portion thereof into engagement with the registering-tongue and controlled by the action of said tongue.

7. The combination with two pairs of folding-rollers, tapes conveying the folded paper from the first to the second pair of said rollers, and a gage arresting the delivered paper, of a bracket sustained on the central portion of said gage, a laterally-yielding registering-tongue suspended from said bracket and disposed to engage a slit made in the paper at right angles to the folded edge, a paper-lifter at one side of the registering-tongue, a paper-depressor at the opposite side of said tongue, and means for shifting the arrested sheet on a line parallel with the gage and controlled by the action of the registering-tongue.

8. The combination with two pairs of folding-rollers, tapes conveying the folded paper from the first to the second pair of said rollers, and a gage arresting the delivered paper, of a bracket sustained longitudinally adjustable on said gage, a laterally-yielding registering-tongue suspended from said bracket and disposed to engage a slit made in the paper at right angles to the folded edge, and mechanisms sustained adjustably along a line parallel with the gage and provided with means for shifting the paper in said direction and controlled by the action of the registering-tongue, as set forth.

9. The combination with two pairs of folding-rollers, tapes conveying the folded paper from the first to the second pair of said rollers, and a gage arresting the delivered paper, of a bracket sustained longitudinally adjustable on said gage, a laterally-yielding registering-tongue suspended from said bracket and disposed to engage a slit made in the paper at right angles to the folded edge, a paper-lifter and a paper-depressor respectively at opposite sides of said registering-tongue and attached to the aforesaid bracket, and mechanisms sustained adjustably along a line parallel with the gage and provided with means for shifting the paper in said direction and controlled by the action of the aforesaid registering-tongue as set forth.

10. The combination with two pairs of folding-rollers, tapes conveying the folded paper from the first to the second pair of said rollers, and a gage arresting the delivered paper, of a bracket sustained longitudinally adjustable on the central portion of said gage, a laterally-yielding registering-tongue suspended from said bracket and disposed to engage a slit made in the folded edge of the paper at right angles to said edge, a circuit-maker actuated by said tongue, mechanisms sustained adjustably along a line parallel with the aforesaid gage and provided with means for shifting the paper in said direction, and an electromagnet in circuit with the aforesaid maker and controlling the said shifting means, as set forth.

11. The combination with two pairs of folding-rollers, tapes conveying the folded paper from the first to the second pairs of said rollers, and a gage arresting the delivered paper, of a bracket composed of a main stay secured longitudinally adjustable on the central portion of the aforesaid gage, and a supplemental plate secured vertically adjustable on said main stay, a laterally-yielding registering-tongue suspended from said plate and disposed to engage a slit made in the folded edge of the paper at right angles to said edge, and means for shifting the arrested paper to bring the registering-tongue into engagement with the slit and controlled by the action of said tongue as set forth.

12. The gage provided with a longitudinal groove in combination with a bracket composed of a main stay riding on said gage and provided with a tongue engaged with the aforesaid groove, vertical and longitudinal slots in said main stay and a screw-threaded eye on the main stay axially parallel with the gage, an arm clamped longitudinally adjustable on the gage, an adjusting-screw journaled in said arm and engaging the aforesaid eye, a bolt passing through the horizontal slot of the main stay and clamping the latter adjustably on the gage, a supplemental plate fitted to the main stay by vertical tongue-and-groove joint, a bolt passing through the vertical slot of the main stay and clamping the supplemental plate adjustably in its position, and a laterally-yielding registering-tongue suspended from said plate as set forth.

13. The combination with a sheet-arresting gage, of a bracket secured to said gage, a registering-tongue suspended from said bracket adjacent to the face of the gage, an arm attached to the bracket and extending from the under side of the gage and horizontally from the face thereof, a plate extending ascendingly toward the face of the gage at one side of the registering-tongue, and a finger attached to the bracket and extending ascendingly from the face of the gage at the opposite side of the registering-tongue, the portions of said plate and finger adjacent to the registering-tongue being disposed to receive the advance edge of the sheet between them and that of the finger being in a plane slightly below that of the plate to open the registering slit in the paper abutting against the gage as set forth.

14. In a paper-folding machine having the first and second pairs of folding-rollers parallel with each other, and succeeding folding-rollers disposed at right angles to said second pair, a gage arresting the sheet at the second pair of rollers, a registering instrument supported upon the central portion of said gage and provided with a laterally-yielding registering-tongue disposed to engage a slit made in the folded edge of the sheet at right angles to said edge, means for shifting the arrested sheet lengthwise of the gage, a supplemental registering instrument disposed to engage the side edge of the sheet, electric-circuit makers actuated by said registering instruments, and an electromagnet in circuit with said makers and controlling the aforesaid paper-shifting means.

15. A paper-folding machine comprising the first and second pairs of folding-rollers arranged parallel with each other, a cutter severing the twice-folded sheet on a line at right angles to the aforesaid folding-rollers, succeeding folding-rollers operating on the severed portions of the sheet, a gage arresting the once-folded sheet at the second pair of folding-rollers, a bracket supported longitudinally adjustable on the central portion of said gage, a laterally-yielding registering-tongue supported on said bracket and disposed to engage a slit made in the folded edge of the sheet at right angles to said edge, an electric-circuit maker actuated by said tongue, mechanism shifting the arrested sheet lengthwise of the gage, a marginal registering instrument provided with a finger actuated by contact with the side edge of the shifting sheet, a circuit-maker actuated by said finger and an electromagnet in circuit with said makers and controlling the action of the shifting mechanism as set forth.

16. A point-feed paper-registering instrument comprising a slit-opening bridge, a registering-tongue disposed to engage the slit and a stationary support carrying in common said bridge and tongue.

17. A point-feed paper-registering instrument comprising a slit-opening bridge, a sheet-depressor coöperating with said bridge, a registering-tongue disposed to engage the slit, and a stationary support carrying in common said parts of the instrument.

18. In combination with sheet-delivering means and the front stop arresting the delivered sheet, a bracket supported adjustably along a line transversely to the line of the sheet-delivery, and a registering instrument comprising a slit-opening bridge, a sheet-depressor and a registering-tongue disposed to engage the slit all supported on the aforesaid bracket as set forth.

19. In combination with sheet-delivering means and the front stop arresting the delivered sheet, a bracket supported adjustably along the line at right angles to the line of the sheet-delivery, a registering instrument comprising a slit-opening bridge, a sheet-depressor and a registering-tongue all supported on said bracket, and means for shifting the arrested sheet laterally from its delivery as set forth.

TALBOT C. DEXTER. [L. S.]

Witnesses:
 G. V. B. LEITCH,
 M. E. MORRISON.